Patented May 4, 1943

UNITED STATES PATENT OFFICE 2,318,174

2,318,174
DYESTUFFS OF THE ANTHRAQUINONE SERIES

Ralph N. Lulek, Wilmington, Del., and Edwin C. Buxbaum, Swarthmore, Pa., assignors to E. I. du Pont de Nemours & Company, Wilmington, Del., a corporation of Delaware No Drawing. Application July 25, 1940, Serial No. 347,486

5 Claims. (Cl. 260—316)

This invention relates to the production of new dyestuffs of the anthraquinone series, and has for its object to produce new dyes for dyeing wool, silk and related fibers directly in gray shades of good fastness properties.

While a number of gray dyes have been produced in the acid wool dyestuff field they are in the main deficient in fastness properties even after chroming and since gray colors are in great demand for dyeing wool every effort has been made to produce dyes of this shade which will dye directly and have improved dyeing properties.

It is known that the anthraquinone-naphthcarbazoles of the general formula

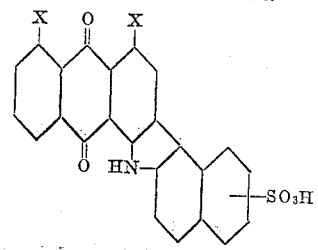

in which one X stands for an acidylamino-group, dye wool in brown shades, irrespective of whether the acidylamino group is of the alkyl or benzene series or whether the phenyl or naphthyl group contains other simple monovalent substituents (see U. S. P. 2,093,355).

We have found that valuable dyes may be produced in this class which dye animal fibers directly (without chroming) in desirable gray shades by introducing in the remaining alpha position on the anthraquinone nucleus of the compound above formulated an amino, alkylamino-, arylamino or aralkylamino-group, and that these new gray dyes exhibit good fastness properties, particularly to light. While these new dyestuffs dye wool directly in gray shades from an acid bath without chroming they possess the further advantage that upon chroming they also dye in gray shades showing very little change in color.

The new dyes of our invention have the general formula

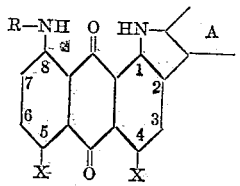

in which one X stands for the radical

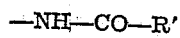

in which R' stands for an alkyl or aryl radical of the benzene series, and the remaining X stands for hydrogen, and where R stands for H, alkyl, aryl, or aralkyl of which the aryl radicals are of the benzene series, and A stands for the naphthalene nucleus.

These new compounds may be produced by the following general procedure:

1-amino-5-chloroanthraquinone may be converted to the 1-benzoylamino-4-amino-5-chloroanthraquinone by first converting the free amino group to the oxaminic acid group and then nitrating the resulting compound in sulfuric acid followed by hydrolysis of the oxaminic acid group, benzoylation of the free amine and reduction of the nitro group to the amino group. Where substituted amino compounds are to be produced the amino group may be directly alkylated or aralkylated or the nitro group may be selectively replaced with organic amine groups by the known methods. The 1-benzoylamino-4-amino-5-chloroanthraquinone is then condensed with a naphthylamine and the resulting naphthylamino anthraquinone is ring closed by means of sulfuric acid and the product is then sulfonated. Sulfonation may be effected during the ring closure step.

Where the 1-benzoylamino-4-chloro-5-amino compound is employed as the starting material it may be prepared from 1-amino-5-nitroanthraquinone by converting it to the benzoylamino derivative and mono-chlorinating the product which introduces the chlorine in the 4-position. The nitro group is then reduced to the free amine or it may be substituted by the desired organic amine where substituted amine derivatives are desired.

The following examples are given to illustrate the invention. The parts used are by weight:

Example 1

Twenty-three parts of 1-benzoylamino-4-amino-5-chloro-anthraquinone (obtained from the reduction of 1-benzoylamino-4-nitro-5-chloro-anthraquinone which in turn is prepared from 1-amino-4-nitro-5-chloro-anthraquinone) are mixed with 180 parts of naphthalene, 23 parts of potassium acetate, 20 parts of beta-naphthylamine and 0.3 part of copper acetate and heated to 215–220° C. for a period of eight hours and then cooled slowly to 140° C. At this temperature, there are added 360 parts of solvent naphtha and the mass is allowed to cool to 30° C. over a period of 12 hours. The precipitated base is then filtered off, washed with solvent naphtha, alcohol, and finally with hot water. The blue filter cake consists of 1-benzoylamino-4-amino-5-beta-naphthylamino-anthraquinone.

Seven and one-half parts of the base as obtained above are dissolved at room temperature in 100 parts of 12.5% oleum at 20–30° C. during one hour. The temperature is then raised to 60° C. and held at that temperature until sulfonation is complete as evidenced by the complete solution of one drop of the acid reaction mass in ten cc. of warm water. When sulfonation has been completed, the charge is drowned in 600 parts of ice and water. The precipitated color is filtered off, washed acid free with brine and dried.

The dyestuff is obtained in the form of a powder which dissolves in water to a blue shade. It dyes wool from the usual acid bath in level gray shades of excellent fastness to light.

*Example 2*

Twenty parts of 1-benzoylamino-4-chloro-5-amino-anthraquinone (obtained from the reduction of 1-benzoylamino-4-chloro-5-nitro-anthraquinone) are mixed with 160 parts of naphthalene, 20 parts of potassium acetate, 17 parts of beta-naphthylamine and 0.3 part of copper acetate and the reaction mass heated to 215–220° C. for a period of six hours and then cooled over a period of six hours to 140° C. There are then added 300 parts of solvent naphtha and the diluted reaction mass is allowed to cool to 30° C. over a period of 12 hours. The precipitated base is then filtered off, washed with solvent naphtha, alcohol and finally with hot water and dried. It consists of 1-benzoylamino-4-beta-naphthylamino-5-amino-anthraquinone.

Ten parts of the above base are dissolved in 100 parts of sulfuric acid monohydrate. The color of the solution becomes green. There are then added, 30 parts of 65% oleum and the mass is allowed to stir at 25–30° C. until sulfonation and ring closure is complete. When the sulfonation is finished, the mass is drowned in 800 parts of ice and water, filtered, washed acid free with brine and dried. The resulting product dyes wool from an acid bath in level gray shades much redder than those of the product of Example 1.

*Example 3*

Three parts of 1-lauroylamino-4-amino-5-chloro-anthraquinone (prepared from the reduction of 1-lauroylamino-4-nitro-5-chloro-anthraquinone which is in turn obtained by treating 1-amino-4-nitro-5-chloro-anthraquinone with lauroyl chloride) are mixed with 3 parts of beta-naphthylamine, 30 parts of naphthalene, 3 parts of potassium acetate, 1 part of potassium carbonate and a trace of copper acetate and heated at 215–220° C. for about two hours. When the reaction is complete, the mass is cooled and diluted with 70 parts of solvent naphtha and then cooled to 25–30° C. It is then filtered and the purple blue residue is washed with more solvent naphtha, alcohol and finally with hot water and dried. The product consists of 1-lauroylamino-4-amino-5-beta-naphthylamino-anthraquinone and dissolves in organic solvents with a purple-blue color.

One part of the above base is dissolved in 10 parts of sulfuric acid monohydrate at 30–40° C. The color of the solution is at first red-brown, but changes rapidly to a blue-green shade. When a drop of the mass is completely soluble in 10 cc. of warm water, the sulfuric acid solution is poured into 100 parts of ice. The precipitated dyestuff is filtered, washed with brine and dried. The product is a blue powder which dissolves in water with a blue color and dyes wool from an acid bath in level gray shades.

While in the above examples the dyes contain a free amino group in the 4 or 5 position this amine group may be substituted by alkyl, aryl or aralkyl radicals to give compounds which dye wool, silk and related fibers in shades of gray varying from greenish gray to reddish gray. Alkylamino groups such as methylamino or the higher alkyl amino groups, aralkylamino groups such as benzylamino, and arylamino groups of the benzene series such as anilino, tolidino and higher homologs may be substituted for the amino group in the 4 or 5 position. Aliphatic acidylamino groups such as acetylamino, stearoylamino, or the acidylamino groups of the benzene series such as tolylamino and higher homologues or simple substitution derivatives may replace the benzoylamino group in the compounds of the specific examples with only slight variations in the shade of the resulting dye.

In this specification and claims wherein the words "aryl" and "aralkyl" are employed, and in which the aryl radicals are of the benzene series, the term "benzene series" is used in its ordinary meaning to refer to the monocyclic-benzenoid compounds. As pointed out above, the benzene group may contain simple substituents.

The ring closure of the naphthcarbazole nucleus may be carried out simultaneously with the sulfonation or the sulfonation may be effected after the ring closure by the addition of oleum of the desired concentration. Oleum of from 5 to 65% may be employed to effect the formation of these new dyes at temperatures of from 20 to 100° C. Alpha-naphthylamine may be employed in place of the beta-naphthylamine in the above examples to give dyestuffs of substantially the same shade.

We claim:

1. The water soluble sulfonation derivative of 4-benzoylamino-8-amino-1,2-anthraquinone-2',1'-naphthcarbazole which dyes wool and related fibers in gray shades of good fastness properties.

2. The water soluble sulfonation derivative of 5-benzoylamino-8-amino-1,2-anthraquinone-2',1'-naphthcarbazole which dyes wool and related fibers in gray shades of good fastness properties.

3. The water soluble sulfonation derivatives of 1,2-anthraquinone-naphthcarbazoles of the general formula

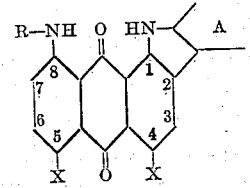

in which one X stands for the radical

—NH—CO—R' in which R' stands for a radical of the class consisting of alkyl radicals and aryl radicals of the benzene series and the remaining X stands for hydrogen, R stands for a substituent of the group consisting of —H, alkyl, aralkyl and aryl radicals of which the aryl radicals are of the benzene series, and A stands for the naphthalene nucleus which contains no further substituents, which dyestuffs dye wool and related fibers in gray shades of good fastness properties.

4. The water soluble sulfonation derivatives of 1,2-anthraquinone-naphthcarbazoles of the general formula

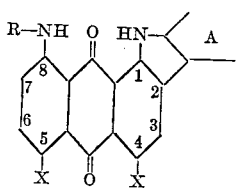

in which one X stands for a benzoylamino radical and the remaining X stands for hydrogen, R stands for a substituent of the group consisting of —H, alkyl, aralkyl and aryl radicals of which the aryl radicals are of the benzene series, and A stands for the naphthalene nucleus which contains no further substituents, which dyestuffs dye wool and related fibers in gray shades of good fastness properties.

5. The water soluble sulfonation derivatives of 1,2-anthraquinone-naphthcarbazoles of the general formula

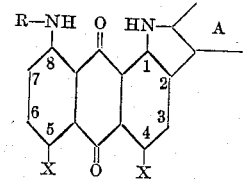

in which one X stands for the group —NH—CO—alkyl and the remaining X stands for hydrogen, R stands for a substituent of the group consisting of —H, alkyl, aralkyl and aryl radicals of which the aryl radicals are of the benzene series, and A stands for the naphthalene nucleus which contains no further substituents, which dyestuffs dye wool and related fibers in gray shades of good fastness properties.

RALPH N. LULEK.
EDWIN C. BUXBAUM.